United States Patent [19]
Billig et al.

[11] Patent Number: 5,282,230
[45] Date of Patent: Jan. 25, 1994

[54] PASSIVE CONTAINMENT COOLING SYSTEM

[75] Inventors: Paul F. Billig; Franklin E. Cooke; James R. Fitch, all of San Jose, Calif.

[73] Assignee: General Electric Company, San Jose, Calif.

[21] Appl. No.: 981,979

[22] Filed: Nov. 25, 1992

[51] Int. Cl.$^5$ ............................................. G21C 15/18
[52] U.S. Cl. .................................. 376/283; 376/299
[58] Field of Search ................. 376/282, 293, 298, 299

[56] References Cited

U.S. PATENT DOCUMENTS

| | | | |
|---|---|---|---|
| 5,008,069 | 4/1991 | Fredell | 376/299 |
| 5,059,385 | 10/1991 | Gluntz et al. | 376/282 |
| 5,082,619 | 1/1992 | Sawyer | 376/283 |
| 5,102,617 | 4/1992 | Gluntz et al. | 376/283 |
| 5,106,571 | 4/1992 | Wade et al. | 376/283 |
| 5,158,742 | 10/1992 | Dillmann | 376/299 |
| 5,169,595 | 12/1992 | Cook | 376/299 |

OTHER PUBLICATIONS

GE Nuclear Energy, "SBWR Technical Description for NRC Staff Presentation," Dec. 1989, pp.: cover; 1.0-1; 1.2-16, 17, 19, 20 & 28; 2.3-1 thru 11, 15-18; 2.6-14 & 42.

Primary Examiner—Daniel D. Wasil
Attorney, Agent, or Firm—J. S. Beulick

[57] ABSTRACT

A passive containment cooling system includes a containment vessel surrounding a reactor pressure vessel and defining a drywell therein containing a non-condensable gas. An enclosed wetwell pool is disposed inside the containment vessel, and a gravity driven cooling system (GDCS) pool is disposed above the wetwell pool in the containment vessel and is vented to the drywell. An isolation pool is disposed above the GDCS pool and includes an isolation condenser therein. The condenser has an inlet line disposed in flow communication with the drywell for receiving the non-condensable gas along with any steam released therein following a loss-of-coolant accident (LOCA). The condenser also has an outlet line disposed in flow communication with the drywell for returning to the drywell both liquid condensate produced upon cooling of the steam and the non-condensable gas for reducing pressure within the containment vessel following the LOCA.

10 Claims, 1 Drawing Sheet

PASSIVE CONTAINMENT COOLING SYSTEM

The U.S. Government has rights in this invention in accordance with Contract No. DE-AC03-90SF18494 awarded by the Department of Energy.

The present invention relates generally to nuclear reactors, and, more specifically, to passive cooling thereof.

BACKGROUND OF THE INVENTION

A nuclear reactor plant includes a containment vessel surrounding a reactor pressure vessel and defining therewith a drywell which typically contains a non-condensable gas such as nitrogen. Disposed in the pressure vessel is a conventional nuclear reactor core submerged in water which is effective for heating the water to generate steam which is discharged from the pressure vessel for use in powering a steam turbine-generator for producing electrical power, for example.

Typically surrounding the pressure vessel within the containment vessel is an annular suppression pool or wetwell which serves various functions including being a heat sink during postulated accidents. For example, one type of accident designed for is a loss-of-coolant accident (LOCA) in which steam from the pressure vessel leaks therefrom into the drywell. Following the LOCA, therefore, the reactor is shut down but residual decay heat continues to be generated for a certain time following the shutdown. In one conventional safety system, the pressure vessel is depressurized by discharging the steam into the wetwell for cooling and condensing and for preventing unacceptably large pressure increases within the containment vessel itself. Traditional safety-related equipment typically require AC power for effective operation.

Accordingly, improved nuclear reactor plants are being developed to reduce or eliminate the need for AC power safety systems following a LOCA, for example. In one design designated a Simplified Boiling Water Reactor (SBWR), a Passive Containment Cooling System (PCCS) is provided for removing heat from the containment vessel during the LOCA. One example of a PCCS is disclosed in U.S. Pat. No. 5,059,385—Gluntz et al, assigned to the present assignee, wherein the wetwell, or suppression pool, is enclosed and separated from the drywell within the containment vessel, and a Gravity Driven Cooling System (GDCS) pool is located above the wetwell within the containment vessel and is vented to the drywell. An isolation pool is disposed above the GDCS pool and contains an isolation condenser having an inlet disposed in flow communication with the drywell, and an outlet joined to a collector chamber from which a vent pipe extends into the wetwell and a condensate return conduit extends into the GDCS pool. The isolation condenser provides passive heat removal from the containment drywell following the LOCA, with steam released into the drywell flowing through the inlet into the isolation condenser wherein it is condensed. The non-condensable gas within the drywell, such as nitrogen, is carried by the steam into the isolation condenser and must be separated therefrom to provide effective operation of the isolation condenser. The collector chamber separates the non-condensable gas from the condensate, with the separated non-condensable gas being vented into the wetwell, and the condensate being channeled into the GDCS pool.

This system relies on the pressure different between the drywell and the wetwell, and, therefore, a water trap is provided at the end of the condensate return conduit in the GDCS pool to restrict backflow of heated fluids from the containment vessel to the wetwell via the condensate return conduit which would bypass the isolation condenser.

Accordingly, this system is configured to transport the non-condensable gas from the drywell to the wetwell and then condense steam from the drywell in the isolation condenser. The non-condensable gas will remain in the enclosed wetwell until the condenser condenses steam faster than it is released from the pressure vessel. When this occurs, the isolation condenser is effective for lowering the drywell pressure below that of the wetwell which will cause conventional vacuum breakers joined to the wetwell to open, and allow the non-condensable gas stored in the wetwell to return to the drywell. However, these gases may then again be channeled into the isolation condenser and lower the cooling effectiveness thereof until the steam release in the drywell again increases the pressure thereof above that of the wetwell which will cause the vacuum breakers to close and the cycle to repeat with the non-condensable gas again being vented into the wetwell from the isolation condenser.

By continually returning the non-condensable gas to the wetwell, the overall containment pressure remains relatively high especially in the enclosed wetwell itself, which must be suitably accommodated by providing stronger, and therefore more expensive, containment walls for example. Furthermore, incremental heating of the top layer of the wetwell pool each time the isolation condenser vents the non-condensable gas therein, and any minor leakage from the vacuum breakers themselves may also cause the containment pressure to slowly rise.

SUMMARY OF THE INVENTION

A passive containment cooling system includes a containment vessel surrounding a reactor pressure vessel and defining a drywell therein containing a non-condensable gas. An enclosed wetwell pool is disposed inside the containment vessel, and a gravity driven cooling system (GDCS) pool is disposed above the wetwell pool in the containment vessel and is vented to the drywell. An isolation pool is disposed above the GDCS pool and includes an isolation condenser therein. The condenser has an inlet line disposed in flow communication with the drywell for receiving the non-condensable gas along with any steam released therein following a LOCA. The condenser also has an outlet line disposed in flow communication with the drywell for returning to the drywell both liquid condensate produced upon cooling of the steam and the non-condensable gas for reducing pressure within the containment vessel following the LOCA.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawing in which.

DESCRIPTION OF THE PREFERRED EMBODIMENT(S)

Figure 1:
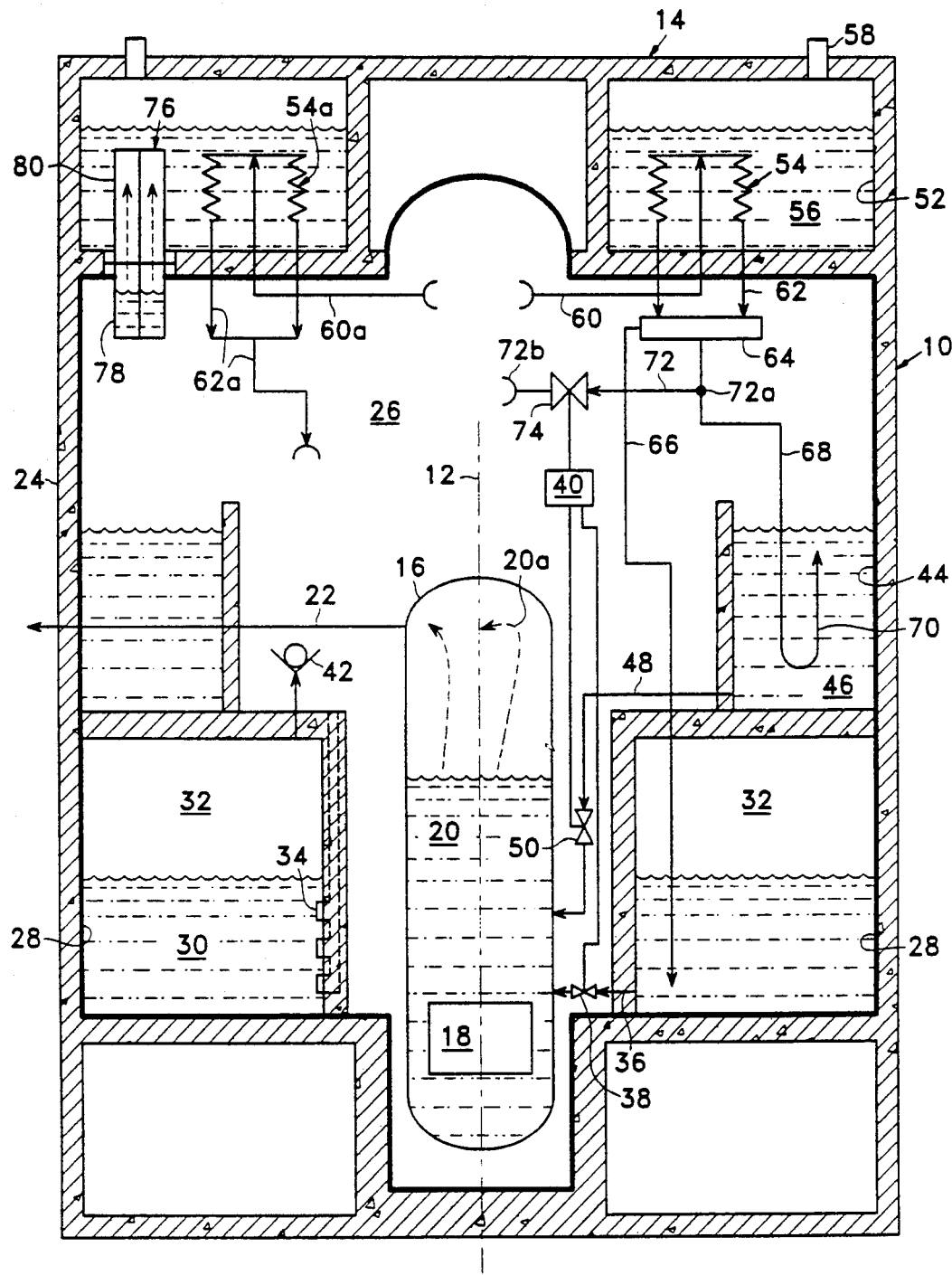
FIG. 1 is a schematic, elevational sectional view of a nuclear reactor building having a Passive Containment Cooling System (PCCS) in accordance with three embodiments of the present invention.

Illustrated schematically in FIG. 1 is an exemplary annular reactor building 10 having a longitudinal centerline axis 12. The building 10 includes a Passive Containment Cooling System (PCCS) 14 in accordance with exemplary embodiments of the present invention. The PCCS 14 includes a reactor pressure vessel 16 containing a nuclear reactor core 18 therein submerged in reactor water 20, with the core 18 being conventionally effective for heating the reactor water 20 to generate reactor steam 20a. The steam 20a is conventionally discharged from the pressure vessel 16 through a main steamline 22 joined to a conventional steam turbine-generator (not shown) for conventionally producing electrical power, for example.

An annular containment vessel, or simply containment 24 is spaced radially outwardly from the pressure vessel 16 and generally coaxial therewith to define a drywell, or plenum, 26 conventionally containing a non-condensable gas such as nitrogen. The containment 24 is a conventional concrete structure having a steel liner sized and configured for withstanding elevated pressure for safely containing the pressure vessel 16 and reactor core 18.

An enclosed annular suppression or wetwell pool 28 is disposed in the containment 24 and is conventionally partially filled with water 30 to define a wetwell plenum or airspace 32 thereabove. The wetwell pool 28 provides various conventional functions including being a heat sink and includes, for example, conventional horizontal vents 34 for channeling therein any steam released from the pressure vessel 16 during a loss-of-coolant accident (LOCA) for example. Steam channeled into the wetwell pool 28 through the vents 34 is suitably quenched therein.

The wetwell pool 28 is typically disposed at least in part at an elevation above the reactor core 18 and includes means for selectively allowing gravity to drain the wetwell pool water 30 into the pressure vessel 16 for ensuring cooling of the reactor core 18 following the LOCA. Such means conventionally includes an outlet line 36 having a conventional valve 38 therein which is operatively connected to a conventional controller 40 for either automatically or manually opening the valve 38 when required. Means are also provided for selectively venting the wetwell plenum 32 into the drywell 26 when the pressure in the wetwell plenum 32 exceeds the pressure in the drywell 26 following the LOCA. Such means include one or more conventional vacuum breakers 42 disposed in flow communication with the wetwell plenum 32. The vacuum breaker 42 is normally closed when the pressure in the drywell 26 is equal or greater than the pressure in the wetwell plenum 32, and automatically opens under pressure when the pressure in the wetwell plenum 32 is suitably greater than the pressure in the drywell 26 for venting the wetwell plenum 32 into the drywell 26.

The PCCS 14 further includes a conventional Gravity Driven Cooling System (GDCS) pool 44 disposed in the containment 24 and vented therein to the drywell 26. The GDCS pool 44 is disposed at an elevation above the reactor core 18 and the wetwell pool 28, and includes water 46 therein. Means are also provided for selectively channeling by gravity the GDCS pool water 46 into the pressure vessel 16 for cooling the reactor core 18 following the LOCA in a conventional manner. Such means include a conventional outlet line 48 and valve 50 therein disposed in flow communication between the GDCS pool 44 and the pressure vessel 16, with the valve 50 being conventionally operatively joined to the controller 40 so that it may be conventionally opened when required for allowing the GDCS pool water 46 to flow by gravity into the pressure vessel 16 in a conventional manner.

A conventional annular isolation pool 52 is disposed in the reactor building 10 above the containment 24 and at an elevation above the GDCS pool 44 in a conventional configuration. The isolation pool 52 contains a preferably vertically extending isolation condenser 54 submerged in isolation water 56. The isolation pool 52 includes one or more vents 58 to atmosphere outside the containment 24 and building 10 for venting the airspace above the isolation pool water 56 for discharging heat therefrom upon use of the isolation condenser 54.

The condenser 54 is conventional and includes an inlet line 60 preferably disposed in direct flow communication with the drywell 26 by having an open end disposed therein for receiving the non-condensable gas along with any steam released from the pressure vessel 16 into the drywell 26 following the LOCA. In the event of a LOCA, steam is released into the drywell 26 and has a pressure greater than the pressure within the wetwell plenum 32. The steam will, therefore, flow into the inlet line 60 and carry with it the non-condensable gas originally contained in the drywell 26. The steam is then conventionally cooled in the coils of the isolation condenser 54 by the isolation pool water 56 with the heat liberated therefrom being vented through the vent 58 to the atmosphere, and the resulting condensate therefrom being discharged from the condenser 54 through one or more outlet lines 62.

In one embodiment of the present invention, a coventional collector chamber, or simply collector 64 is disposed in flow communication with the condenser outlet 62 and has a gas vent line 66 conventionally disposed in flow communication with the wetwell pool 28, and further has a liquid condensate drain line 68 conventionally disposed in flow communication with the GDCS pool 44. The drain line 68 has a conventional U-shaped distal end 70 disposed in the GDCS pool 44 under the pool water 46 for forming a conventional water trap or loop seal, also designated 70. The loop seal 70 allows discharge of the condensate from the collector 64 into the GDCS pool 44 and restricts backflow of the steam and non-condensable gas in the drywell 26 following the LOCA from flowing backwardly through the drain line 68 and upwardly toward the collector 64 to pypass the isolation condenser 54 and enter the wetwell pool 28 through the vent line 66 as conventionally known.

In conventional operation, steam released into the drywell 26 following the LOCA is channeled through the inlet line 60 and through the isolation condenser 54 which removes heat therefrom and forms the condensate carried through the outlet line 62 into the collector 64. The non-condensable gas carried with the steam through the isolation condenser 54 is separated in the collector 64, with the separated non-condensable gas being vented through the vent line 66 into the wetwell pool 28 wherein it accumulates in the wetwell plenum 32 above the wetwell water 30. The condensate from the collector 64 is discharged through the drain line 68 into the GDCS pool 44. As the non-condensable gas accumulates in the wetwell plenum 32, the pressure therein increases until the isolation condenser 54 condenses steam faster than it is released from the pressure vessel 16. At such time, the pressure within the drywell 26 will fall below that of the pressure in the wetwell plenum 32 which will cause the vacuum breakers 42 to open and return the non-condensable gas to the drywell 26. However, this gas will then be allowed to flow again into the isolation condenser 54 and lower its effectiveness until the steam being released in the drywell 26 again increases the pressure therein above that of the wetwell plenum 32 at which time the vacuum breakers 42 will close and the cycle will be repeated with the non-condensable gas being vented from the isolation condenser 54 into the wetwell plenum 32 wherein it again accumulates with rising pressure.

This operation of continually returning the non-condensable gas to the wetwell plenum 32 results in a relatively high overall pressure in the containment 24 especially in the wetwell plenum 32. Furthermore, incremental heating of the top layer of the wetwell pool water 30 each time the non-condensable gas is vented from the isolation condenser 54 into the wetwell plenum 32, and any small leakage through the vacuum breakers 42 may cause pressure in the containment 24 to slowly rise.

In accordance with one object of the present invention, means are provided for selectively bypassing the loop seal 70 to join the collector 64 in direct flow communication with the drywell 26 for returning directly to the drywell 26 both the condensate non-condensable gas from the isolation condenser 54.

More specifically, the bypassing means includes a bypass line 72 having an inlet 72a joined in flow communication with the drain line 68 preferably between the collector 64 and the loop seal 70. The bypass line 72 also includes an outlet 72b disposed in direct flow communication with the drywell 26, and a normally closed bypass valve 74 is disposed in serial flow in the bypass line 72 and is operatively joined to the controller 40 for being selectively opened for channeling the condensate and the non-condensable gas from the collector 64 through the top portion of the drain line 68 and through the bypass line 72 for return to the drywell 26, The bypass valve 74 is preferably a conventional explosive or squib valve which may be manually or automatically activated open using the controller 40, for example.

When the bypass valve 74 is opened, it creates a direct flowpath from the collector 64 to the top portion of the drain line 68 and the bypass line 72 to the drywell 26 and bypasses the lower portion of the drain line 68 and the loop seal 70. The loop seal 70 is only required early during the LOCA when the isolation condenser 54 is unable to condense all of the steam released into the drywell 26. Accordingly, the bypass valve 74 may be opened after such time for directly returning to the drywell 26 by natural circulation both the condensate produced upon cooling of the steam in the isolation condenser 54 and the non-condensable gas carried with the steam through the isolation condenser 54.

More specifically, the tubes of the isolation condenser 54 are preferably vertically extending so that the condensate formed therein may flow by gravity downwardly through the outlet line 62, the collector 64, the top of the drain line 68, and through the bypass line 72 to fall by gravity back in to the drywall 26. And, cooling of the steam inside the isolation condenser 54 lowers its pressure and forms a vacuum which draws additional steam from the drywell 26 into the condenser 54 through the inlet line 60. This natural circulation of steam being drawn into the isolation condenser 54 and the condensate falling by gravity back into the drywell 26 allows the isolation condenser 54 to continue to effectively remove heat from the containment 24 while returning the non-condensable gas directly to the drywell 26 without the need to continue to vent it to the wetwell plenum 32. Accordingly, the overall containment pressure including that in the wetwell plenum 32 may be reduced in accordance with the present invention.

Furthermore, the isolation condenser 54 will eventually condense steam faster than it is released into the drywell 26 which will cause the pressure within the drywell 26 to fall below the pressure in the wetwell plenum 32 and then the vacuum breakers 42 will open returning into the drywell 26 even more of the non-condensable gas initially accumulated in the wetwell plenum 32 following the LOCA. The overall containment pressure will, therefore, continue to decrease as the reactor decay heat decreases which decreases the amount of steam released into the drywell 26.

In order to supplement heat removal from the isolation condenser 54 and further reduce the overall containment pressure during the LOCA, a second isolation condenser 54a is also submerged in the isolation pool 52, with the isolation condenser 54 being designated a first isolation condenser. Of course, one or more of each type of isolation condensers 54 or 54a may be used as desired depending upon the specific requirements for removing heat from the containment 24. The second isolation condenser 54a similarly includes an inlet line 60a disposed in direct flow communication with the drywell 26 for receiving a portion of the steam released therein during the LOCA and the non-condensable gas carried therewith. Both inlet lines 60 and 60a may be identical in configuration for receiving respective portions of the released steam and non-condensable gas from the drywell 26 with unobstructed flow thereof for allowing natural circulation to carry the steam and non-condensable gas into the inlet lines 60, 60a.

The second isolation condenser 54a further includes one or more outlet lines 62a disposed in direct flow communication with the drywell 26 for returning thereto both the condensate produced in the second isolation condenser 54a and the non-condensable gas carried with the steam through the second isolation condenser 54a. The outlet line 62a of the second isolation condenser 54a is analogous to the outlet line 62, the top portion of the drain line 68, and the bypass line 72 when the bypass valve 74 is open for providing a direct and unobstructed flowpath from the second isolation condenser 54a directly to the drywell 26 for allowing natural circulation to carry the condensate and non-condensable gas therethrough for return to the drywell 26.

The first isolation condenser 54 is initially operatively connected to the GDCS pool 44 through the loop seal 70 when the bypass valve 74 is initially closed for allowing conventional operation of the isolation condenser 54 during the initial stages of the LOCA to vent the non-condensable gas through the vent line 66 into the wetwell plenum 32 and to drain the condensate into the GDCS pool 44 through the drain line 68. However, once the loop seal 70 is no longer needed to restrict backflow of the pressurized steam and non-condensable gas in the drywell 26 from flowing backwardly through the drain line 68, the bypass valve 74 may be opened to bypass the loop seal 70 and join the outlet line 62 of the first condenser 54 directly to the drywell 26.

Accordingly, the first isolation condenser 54 initially operates under the difference in pressure between the drywell 26 and the wetwell plenum 32, and after opening of the bypass valve 74 relies solely on natural circulation through the isolation condenser 54 for carrying steam therein and returning the condensate to the drywell 26 while ensuring that the non-condensable gas remains in the drywell 26 or is directly returned thereto without venting to the wetwell plenum 32.

In contrast, the second isolation condenser 54a does not utilize a collection chamber 64, a loop seal 70, a bypass valve 74, or vent line 66, but relies solely on natural circulation to carry steam therethrough and return the condensate to the drywell 26 for supplementing the heat removal from the containment 24 while returning the non-condensable gas directly to the drywell 26 for obtaining a lower overall containment pressure during the LOCA.

The first isolation condenser 54 may be further supplemented for removing heat from the containment 24 again without venting the non-condensable gas to the wetwell plenum 32 by using a plurality of vertically extending conventional heat pipes 76, two exemplary ones of which being illustrated schematically in FIG. 1. The heat pipes 76 contain a working fluid such as water, with each heat pipe 76 having a first or hot tube 78 extending downwardly through the top of the containment 24 into the drywell 26, and an integral second or cold tube 80 extending vertically upwardly in the isolation condenser pool 52. The hot tube 78 is conventionally effective to evaporate the working fluid therein to form a vapor upon heating from the steam released in the drywell 26 which surrounds the hot tube 78. The vapor inside the hot tube 78 rises upwardly by natural circulation into the integral cold tube 80 for being condensed upon cooling from the isolation pool water 56, with the condensate returning by gravity into the hot tube 78 for repeating the cycle.

Accordingly, the non-condensable gas within the drywell 26 does not enter the heat pipes 76 but always remains in the drywell 26, with the heat pipes 76 providing cooling of the containment 24 as a supplement to the first isolation condenser 54.

Toward the end of the LOCA when the decay heat from the reactor core 18 has substantially decreased, it is expected that the total heat load therefrom could be removed solely by the heat pipes 78. Furthermore, in the event that the first and second isolation condensers 54 or 54a become less effective for removing heat due to any of the non-condensable gas remaining therein during operation, the heat pipes 76 can remove the remainder of the heat as required from the containment 24. A suitable number of the heat pipes 76 may be chosen as required for each design application, and conventional fins may be attached thereto if desired for increasing the heat transfer rate from the steam within the drywell 26 into the working fluid within the hot tubes 78.

The provision of the first and second isolation condensers 54 and 54a as above described allows for an improved method of passively cooling the containment 24 which includes the steps of channeling the steam released into the drywell 26 following the LOCA into the isolation condensers 54, 54a for cooling along with the non-condensable gas contained in the drywell 26 which is carried therewith. The method also includes returning both the condensate formed in the isolation condensers 54, 54a from cooling the steam therein, and the non-condensable gas carried therewith directly to the drywell 26 by natural circulation.

Whereas the second isolation condenser 54a relies solely on natural circulation for its operation, the first isolation condenser 54 joined to the collector 64, and in turn to the vent line 66 and the drain line 68, allows the method to further include the steps of firstly separating the condensate from the non-condensable gas discharged from the first isolation condenser 54 in the collector 64; then separately channeling the non-condensable gas to the wetwell pool 28 and plenum 32 through the vent line 66, and the condensate to the GDCS pool 44 through the drain line 68 and the loop seal 70 disposed in the GDCS pool 44; and, after a predetermined time at which the first isolation condenser 54 is able to condense all of the steam it receives from the drywell 26, the method lastly includes bypassing the loop seal 70 for returning both the condensate and the non-condensable gas directly to the drywell 26 by natural circulation through the bypass line 72.

Accordingly, the PCCS 14 disclosed above in various embodiments is effective for removing decay heat from the containment 24 while reducing the overall pressure rise of the containment 24 which would otherwise occur without bypassing the non-condensable gases directly into the drywell 26 instead of being continually vented into the wetwell plenum 32 through the vent line 66.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A pressure containment cooling system comprising:
   a reactor pressure vessel containing a reactor core therein submerged in reactor water, said core being effective for heating said reactor water to generate steam;
   a containment vessel spaced outwardly from said pressure vessel to define a drywell containing a non-condensable gas;
   an enclosed wetwell pool disposed in said containment vessel and partially filled with water to define a wetwell plenum thereabove, said wetwell pool having means for selectively venting said wetwell plenum into said drywell when pressure in said wetwell plenum exceeds pressure in said drywell;
   a gravity driven cooling system (GDCS) pool disposed in and vented to said containment vessel at an elevation above said reactor core and said wetwell pool, and including water therein and means for selectively channeling by gravity said GDCS pool water into said pressure vessel; and
   an isolation pool disposed at an elevation above said GDCS pool and containing an isolation condenser submerged in water, said isolation pool having a vent to atmosphere outside said containment vessel, and said condenser having an inlet line disposed in flow communication with said drywell for receiving said non-condensable gas along with any steam released from said pressure vessel into said drywell following a loss-of-coolant accident (LOCA), and further having an outlet line disposed in flow communication with said drywell for returning to said drywell both condensate produced upon cooling of said steam in said condenser and said non-condensable gas carried with said steam through said isolation condenser.

2. A system according to claim 1 wherein both said isolation condenser inlet and outlet lines are disposed in unobstructed flow communication with said drywell for allowing natural circulation to carry said steam and said non-condensable gas into said inlet line, and to return to said drywell through said outlet line said condensate and said non-condensable gas.

3. A system according to claim 1 further comprising:
   a collector disposed in flow communication with said condenser outlet line, and having a vent line disposed in flow communication with said wetwell pool, and a drain line disposed in flow communication with said GDCS pool, said drain line having a U-shaped distal end disposed in said GDCS pool for forming a loop seal to allow discharge of said condensate into said GDCS pool and to restrict backflow through said drain line upwardly toward said collector; and
   means for selectively bypassing said loop seal to join said collector in direct flow communication with said drywell for returning to said drywell both said condensate and said non-condensable gas.

4. A system according to claim 3 wherein said bypassing means includes a bypass line having an inlet joined in flow communication with said drain line between said collector and said loop seal, an outlet disposed in flow communication with said drywell, and a normally closed bypass valve disposed on serial flow therein and being selectively openable for channeling said condensate and said non-condensable gas from said collector through said bypass line for return to said drywell.

5. A system according to claim 4 wherein said bypass valve is an explosive valve.

6. A system according to claim 5 wherein said isolation condenser is a first isolation condenser; and further comprising:
   a second isolation condenser submerged in said isolation pool, and having an inlet line disposed in flow communication with said drywell for receiving a portion of said non-condensable gas and said steam released into said drywell following said LOCA, and an outlet line disposed in flow communication with said drywell for returning to said drywell both said condensate produced in said second isolation condenser and said non-condensable gas carried with said steam through said second isolation condenser.

7. A system according to claim 6 wherein both said second isolation condenser inlet and outlet lines are disposed in unobstructed flow communication with said drywell for allowing natural circulation to carry said steam and said non-condensable gas into said inlet line, and to return to said drywell through said outlet line said condensate and said non-condensable gas.

8. A system according to claim 7 further comprising a plurality of heat pipes containing a working fluid, each heat pipe having a hot tube extending downwardly into said drywell, and an integral cold tube extending upwardly into said isolation pool, said hot tube being effective to evaporate said working fluid to form a vapor therein upon heating from said steam released in said drywell, said vapor rising by natural circulation upwardly into said cold tube for being condensed therein upon cooling from said isolation pool water and returning by gravity back to said hot tube.

9. A method for passively cooling a containment vessel spaced outwardly from a pressure vessel defining a drywell therebetween, said pressure vessel including a nuclear reactor core, and said containment vessel including an enclosed wetwell pool disposed above said reactor core, and a gravity driven cooling system (GDCS) pool disposed above said wetwell pool, and an isolation pool disposed above said containment vessel and containing an isolation condenser, said method comprising:
   channeling steam released into said drywell following a loss-of-cooling accident (LOCA) into said isolation condenser for cooling along with non-condensable gas contained in said drywell and carried along with said steam; and
   returning both condensate formed in said isolation condenser from cooling said steam therein and said non-condensable gas directly to said drywell by natural circulation.

10. A method according to claim 9 further comprising:
    separating said condensate from said non-condensable gas discharged from said isolation condenser;
    separately channeling said non-condensable gas to said wetwell pool through a vent line, and said condensate to said GDCS pool through a drain line having a loop seal in said GDCS pool; and
    after a predetermined time, bypassing said loop seal for returning both said condensate and said non-condensable gas directly to said drywell by said natural circulation.

* * * * *